July 7, 1970

D. BARRON 3,518,894

RANGE COMPUTER

Filed Oct. 30, 1968

INVENTOR

DANIEL BARRON

BY *Melvin L. Crum* AGENT

*R. Sciascia* ATTORNEY

July 7, 1970

D. BARRON 3,518,894

RANGE COMPUTER

Filed Oct. 30, 1968

INVENTOR

DANIEL BARRON

BY *Melvin L. Crowe* AGENT

*R. Liascos* ATTORNEY

July 7, 1970

D. BARRON 3,518,894

RANGE COMPUTER

Filed Oct. 30, 1968

INVENTOR
DANIEL BARRON

BY *Melvin L Crane* AGENT

*R Kirascia* ATTORNEY

United States Patent Office 3,518,894
Patented July 7, 1970

3,518,894
RANGE COMPUTER
Daniel Barron, 6223 Springfield Court,
Greenbelt, Md. 20770
Filed Oct. 30, 1968, Ser. No. 771,804
Int. Cl. G06c 27/00; F16h 1/06
U.S. Cl. 74—413                                                    2 Claims

ABSTRACT OF THE DISCLOSURE

This device is for determining the range of a target by a sonar operator. This device comprises a plurality of small wheels each of which are adapted to be engaged with a larger wheel to set in specific information with respect to wave height, sea surface temperature, layer depth, etc. in order to convert oceanographic parameters into power limited range. A different set of gears are used to determine sonar range when the target is submerged than when the target is on the surface of the water.

---

The invention described herein may be manufactured and used by or for the Government of the United States of America for governmental purposes without the payment of any royalties thereon or therefor.

BACKGROUND OF THE INVENTION

Heretofore range has been determined by a sonar operator by use of prepared tables, diagrams, large computers, etc. wherein the sonar operator obtains sea values and from these values check tables, etc. or set the values into an expensive computer which computes the range.

SUMMARY OF THE INVENTION

The device of this invention is of simple construction comprising several engageable gear wheels or dials upon which information has been secured for rotation therewith. Sea state information is obtained and the gear wheels are separately engaged and rotated an amount according to the sea state information. After all information is separately fed into the hand operated device, the range may be read. The device is operable for any-one of four different models of sonar equipment and is provided with two separate groups of engageable dial wheels so that one may determine the range for either a submerged or surfaced device.

It is therefore an object of the present invention to provide a simple hand operated computer for determining range.

Another object is to provide a device for determining range which may be carried out by unskilled as well as skilled operators.

Still another object is to provide a simple computer which may be used for determining range for use with four different models of sonar equipment.

While still another object is to provide a simple computer which may be used to determine range of a submerged as well as a surfaced object.

Other and more specific objects of this invention will become apparent upon a careful consideration of the following detailed description when taken together with the accompanying drawings.

DESCRIPTION OF THE PREFERRED EMBODIMENT

Figure 1:
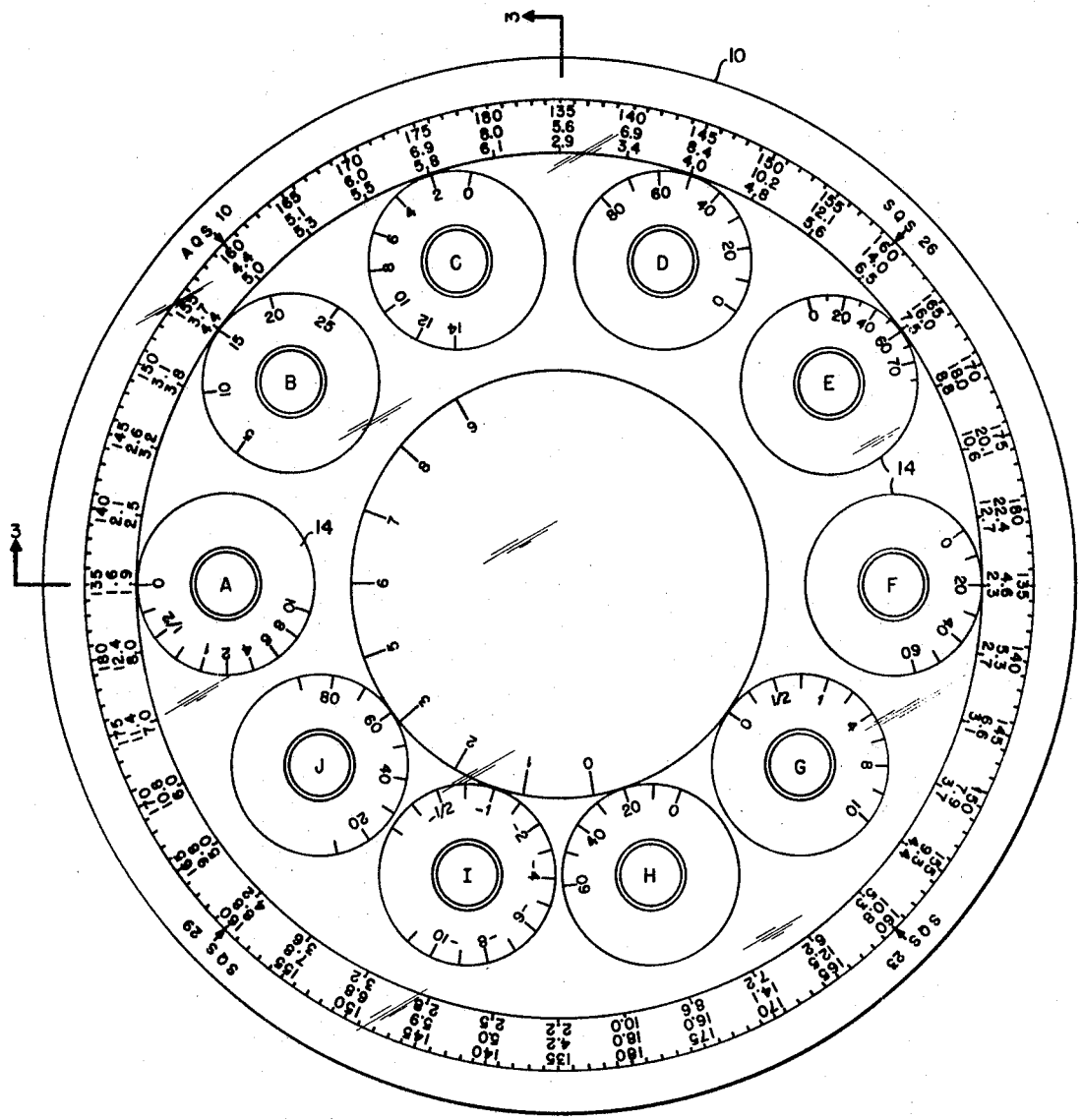
FIG. 1 is a top view illustrating the different dials and the different values used on the dials.
Figure 2:
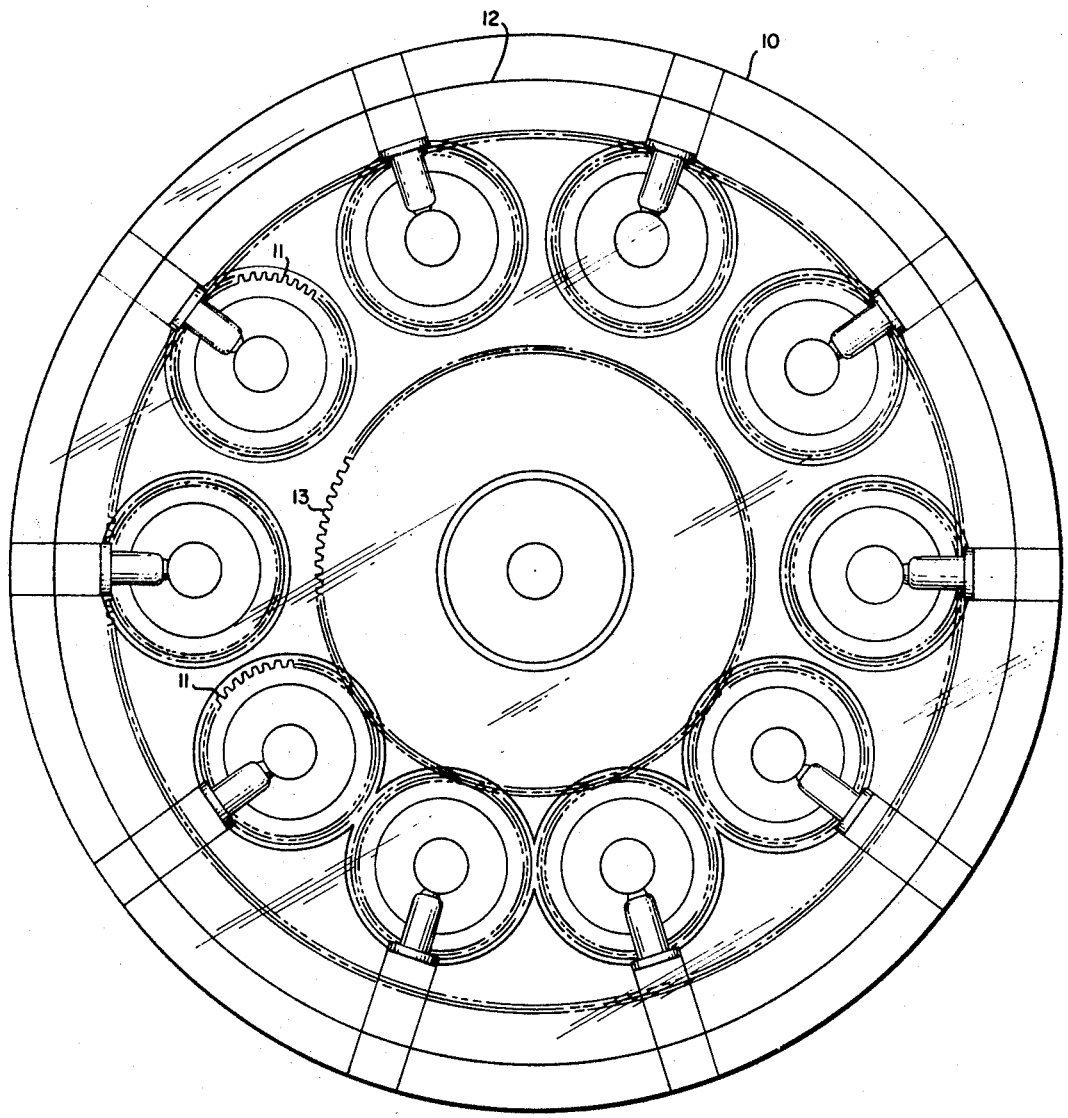
FIG. 2 is a bottom view illustrating the relationship of the gears and a detent for holding the dials in an engaged or disengaged condition.
Figure 3:
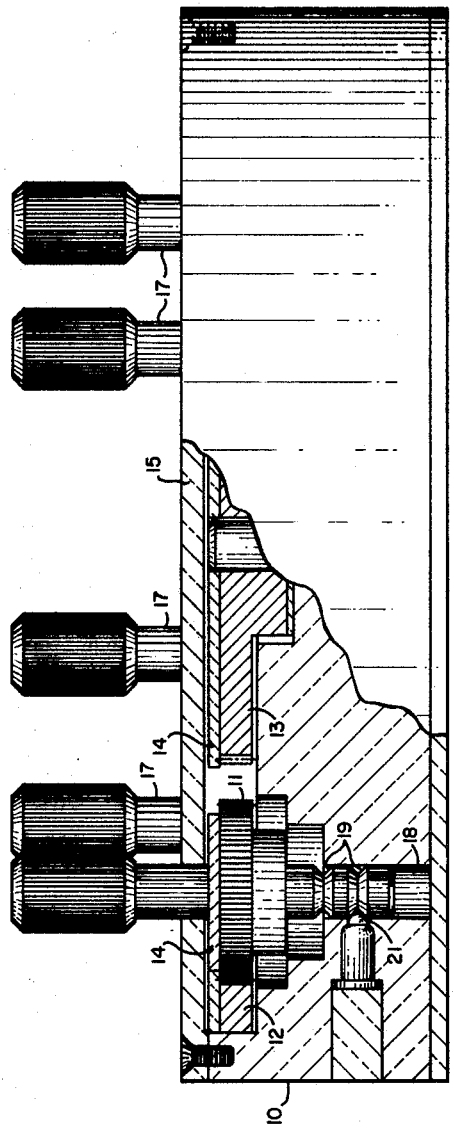
FIG. 3 is a cut away looking into the side illustrating one of the drive gears with the gear meshed with an outer ring and the detent in place to hold the gear in a meshed position.

Now referring to the drawings, there is shown by illustration the structural arrangement of the computer for determining range. As shown, the device includes a housing 10 within which there are mounted ten small rotatable gears 11 (A–F) which are arranged to engage an outer rotatable gear ring 12 and four (G–J) of which are arranged to engage a central gear wheel 13 which is arranged coaxially with the housing. Each of the gear wheels are provided with an indicia or dial plate 14 on the upper surface thereof which is approximately the same diameter as the gear wheel. The dial plates each contain specific information thereon which will be set forth later. A clear cover 15 fits over the gear wheels thereby preventing the gears from falling from the housing.

Each of the small gear wheels 11 are arranged with a shaft 17 that extends upwardly through the housing cover to enable the operator to rotate each of the gear wheels separately. The lower end of the shaft extends downwardly into a well 18 which acts as a bearing and to hold the small gear wheels in place. Each of the small gears are movable along a line perpendicular to the top and bottom such that the gear wheels are disengaged from the outer ring or the central gear wheel. Therefore, each of the gear shafts are provided with two circular grooves 19 in which a detent pin 21 fits. The spacing of the grooves are such that the detent pin holds the gears in an engaged or disengaged position. Any other suitable means may be used to secure the gears in their proper position, and the gears may be beveled instead of being straight, as shown, if desired. Thus, each of the gears may be moved into engagement with the ring gear or central gear as the case may be depending on which small gear wheels are moved in order to independently rotate the outer ring gear or the central gear. That is, the outer ring gear will be rotated by either of the six gear wheels (A–F) that are engaged therewith whereas the central gear wheel may be rotated by either one of the remaining four gear wheels (G–J) by engagement therewith. The gear wheels are arranged to rotate either the outer gear ring or the central gear wheel but not both, according to the position in which the gears are arranged in the housing.

The dials on the small gear wheels are as follows:
A—Temperature gradient in layer deg. F./100 ft. having values from 0 to +10 each space being spaced 19° apart.
B—Target aspect: Numerical value of 5–25 each space being 5 decibels and spaced 45° apart.
C—Wave height (feet) value from 0–14 ft. each space being 2 ft. and spaced 28° apart.
D—Probability of detection 0–80(%) with each scale representing spaces of 10% in which each spacing is 20° apart.
E—Sea surface temperature 30–90 (degrees Fahrenheit) with each scale representing 10 degrees with a spacing of 10°.
F—Layer depth (tens of feet) 0–60 wth each space 18° apart.
G—Temperature gradient in layer deg. F/100 ft. 0 to +10° F./100′ with each spacing being 19° apart.
H—Layer depth (tens of feet) 0–60 with each spacing representing 10 ft. and having a spacing of 18°.
I—Gradient below layer (deg. F./100 ft.) values of −¼ to −10° F./100 each of which are spaced 19° apart.
J—Sea surface temperature (deg. F.) values of 30–90 degrees each space representing 10 degrees and spaced 10° apart.

The outer ring is divided into quadrants and each quadrant contains scale values which may be used for one of four different well known types of sonar equipment SQS–26, 3.5 kc.; SQS–23, 5 kc.; SQS–29, 10 cs.; and AQS–10, 10 kc. Each quadrant is divided into three arcuate scales—the outer scale extends from 135 to 180 in steps of 5 which indicates the performance rating of the sonar equipment in decibels. Each 5 decibels have a spacing of 9 degrees.

The center scale values indicate the power limited periscope depth range (PDR) in kiloyards and the inner scale indicates sonar range for target at best depth range (BDR) kiloyards. The power limited periscope depth range and the sonar range for target at best depth have different scales for the different sonar equipment, therefore, the scales as shown on the drawing have different values.

The values on the inner large gear wheels coaxially arranged within the housing are the best depth range of a target to avoid detection. These values range from 0 to 9 measured in kiloyards. The spacing between each number is 20 degrees and may be applied directly onto the upper surface of the gear wheel or on an attached dial plate.

The target aspect values denote values relative to the aspect of the target with respect to the detector. That is, whether the target is in alignment, end-to-end, broad sides or what the condition may be. The average value is taken as 15, however, in the example illustrated the target aspect was not considered. Other parameters could be added to the computation such as bottom reverberation. However, these would only add to the structural cost and add to the operative manipulations which are not seen to give an added return for the structural and operation cost.

The procedure of operation to determine power limited range for a target at periscope depth and best depth to avoid detection based on assumed conditions is as follows:

(1) Each of the small gear wheels are disengaged and set with reference data which has been determined to be average for obtaining the average range for a given sonar equipment. This data is as follows:

(a) temperature gradient (in layer)=0 deg. F./100 ft.
(b) aspect=quartering
(c) wave height=2 ft.
(d) probability of detection=50%
(e) sea surface temperature=60 deg. F.
(f) layer depth=200 ft.

(2) Obtain performance figures from the given sonar equipment and obtain actual value of the environmental conditions. The following conditions are assumed to have been the actual values obtained.

(a) temperature gradient (in layer)=½ deg. F./100 ft.
(b) aspect=quartering
(c) wave height=3 ft.
(d) probability of detection=65%
(e) sea surface temperature=70° F.
(f) layer depth=400 ft.

The outer ring is set with the performance figure of 162 at the arrow for the equipment used. (in this example SQS–23).

With the gear wheels set with the average values as described above, each gear A–F is individually and separately moved into engagement with the outer ring such that the average value lines up with the ring and the gear that is engaged is rotated to the value as obtained from the actual data. For instance the wave height average value is 2 ft., with the wave height wheel or dial set at 2 such that the value 2 lines up with the outer ring, the gear is moved into engagement and then rotated to the value 3, the actual data. Disengage the wave height gear and proceed to the layer depth wheel setting the value 20 on the wheel for 200 ft. average depth since these values are in (tens of feet). The actual layer depth is 400 ft., therefore, the wheel upon being engaged with the value 20 in alignment with the outer ring is rotated to the value 40 for 400 ft. This wheel is disengaged and the temperature gradient and the remaining wheels are set for average value, sequentially engaged, rotated to the actual value and then disengaged in succession.

After all values have been set into the computer, the final power limited sonar range for target at periscope depth is obtained by reading the value that lines up with the arrow for the SQS–23 sonar. For the example set forth, the value is 9,900 yards.

Since the power limited sonar has been determined, a further look at the values opposite the indicator arrow outside of the data is 4.76 kiloyards which is the sonar range for target at best depth to avoid detection. That is, if the different values are as set forth above, a submarine could be lying 4.76 kiloyards away at a depth of 400 ft. and likely not be detected. Thus, the device may be used to determine the best range for certain conditions and also the best location to avoid detection.

Let's assume that the target is at the best depth to avoid detection, that the layer depth, temperature gradient (in layer) and the sea surface temperature are the same as before the reference data and actual data with the reference range 2.8 kiloyards and the reference gradient below layer is 1° F./100 ft. The actual gradient below layer is 2° F./100 ft.

In computing the ray path range for target at best depth to avoid detection the inner circular gear wheel and the four gears operative therewith are used. The operation is as follows:

(a) Set the center gear dial to the best depth range value (2.8 kiloyards) opposite the arrow.

(b) Set each of the dials G.H.I.J. at their proper value according to the reference data. That is, the value indicated is set so that the value is juxtaposed or tangent to the Best Depth Range dial when set in place.

(c) After setting the dials to the reference data values, engage each gear wheel G.H.I.J. sequentially with the center wheel, rotate each dial independently to the actual value as set forth previously above. After each dial is rotated to the actual value, the gear is disengaged and the next gear is engaged and the dial rotated to its value. Thus, since there are four gear wheels (G.H.I.J.), there will be four separate steps in setting the values into the computer. After all gears have been set and rotated to the actual values, the value on the center gear wheel dial opposite the arrow indicator will be the ray path range to target at best depth for avoiding detection. For the example given, the value is 3.0 kiloyards.

As set forth above, the ray path range of 3.0 kiloyards is smaller than the power limited range of 4.76 kiloyards. Therefore, the actual range to target at best depth below layer is taken to be the smaller value of 3.0 kiloyards.

In order to determine the effects of various oceanographic parameters on the probability of detection the following steps may be taken making use of the values previously set forth as the values used.

(a) Set the outer ring at 162 db opposite the arrow for the SQS—23 sonar.

(b) Set the values on each of the dials according to the reference data given.

(c) engage the probability of detection gear (D) into place at its value of 50% since this has been taken as average. Leave the gear wheel (D) in an engaged position.

(d) Engage wheel (A) with the outer ring of the value given—0 deg. F./100 ft. Rotate wheel A until the dial is at the actual value ½ deg. F./100 ft. Disengage the wheel A.

(e) Successively engage, rotate to actual value, and disengage the remaining gear wheels (B.C.E.F.) for the values given.

After all gears have been engaged, rotated to their respective values and disengaged; the value indicated on the probability of detection dial (D) will indicate the probability of detection.

The computer has been described as being operated by hand. It is obvious that the device could be controlled by electrically operated servo-motors or by other means, if desired.

As can be seen from the above, the device is simple in operation and can be operated by unskilled as well as skilled personnel to carry out the functions of this invention.

It will be obvious to one skilled in the art that different values may be used for the various parameters to determine the effect on the sonar detection capability. That is, errors may be built into the values to determine their effect on the system. Also, cumulative errors of all parameters may be determined. Thus, one may use the computer for determining the effects of different errors on the over all system. As can be seen from the scales on the computer a change (increase) in temperature gradient (in layer), wave height, or probability of detection will decrease the range whereas an increase in aspect, sea surface temperature and layer depth will increase the range. Thus, the computer may show cumulative errors.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A sonar range computer which comprises:
    a cylindrical housing,
    said housing having an upwardly extending outer edge flat surface,
    said flat surface being set off in four sectors,
    an index on the flat surface bisecting each of said sectors,
    a ring gear,
    said gear ring lying along said upwardly extending flat surface of said housing and rotatable relative thereto,
    said ring gear having a flat upper surface on a level with said flat surface of said housing,
    said upper flat surface on said gear ring being divided into four sections,
    each of said four sections on said ring having indicia in three spaced rows of different values thereon,
    a central flat gear wheel in coaxial relationship with said housing and said ring gear,
    said central flat gear wheel having indicia along a portion of one edge thereof,
    a plurality of gear wheels positioned between said outer ring gear and said central flat gear wheel,
    a portion of said gear wheels positioned relative to said ring gear for engagement therewith,
    a portion of said plurality of gear wheels positioned relative to said central flat gear wheel for engagement therewith, and
    each of said plurality of gear wheels having indicia thereon representative of an oceanic environmental condition.

2. A sonar range computer as claimed in claim 1; wherein,
    each of said plurality of gear wheels are normally held in a disengaged position.

References Cited

UNITED STATES PATENTS

| | | | |
|---|---|---|---|
| 3,276,682 | 10/1966 | Phelps | 235—61 |
| 3,282,501 | 11/1966 | Copeland | 235—61 X |
| 3,415,447 | 12/1968 | Heyer | 235—76 X |

LEONARD H. GERIN, Primary Examiner

U.S. Cl. X.R.

235—61